(12) United States Patent
Bar-On et al.

(10) Patent No.: US 10,334,256 B2
(45) Date of Patent: Jun. 25, 2019

(54) VIDEO COMPRESSION METHOD

(71) Applicant: NUMERI LTD., Haifa (IL)

(72) Inventors: Ilan Bar-On, Haifa (IL); Oleg Kostenko, Haifa (IL)

(73) Assignee: NUMERI LTD., Haifa (IL)

( * ) Notice: Subject to any disclaimer, the term of this patent is extended or adjusted under 35 U.S.C. 154(b) by 444 days.

(21) Appl. No.: 14/433,780

(22) PCT Filed: Sep. 30, 2013

(86) PCT No.: PCT/IB2013/059007
§ 371 (c)(1),
(2) Date: Apr. 6, 2015

(87) PCT Pub. No.: WO2014/053982
PCT Pub. Date: Apr. 10, 2014

(65) Prior Publication Data
US 2015/0256837 A1   Sep. 10, 2015

Related U.S. Application Data

(60) Provisional application No. 61/710,723, filed on Oct. 7, 2012.

(51) Int. Cl.
*H04N 19/184* (2014.01)
*H04N 19/63* (2014.01)
(Continued)

(52) U.S. Cl.
CPC ......... *H04N 19/184* (2014.11); *H04N 19/117* (2014.11); *H04N 19/33* (2014.11); *H04N 19/59* (2014.11); *H04N 19/63* (2014.11)

(58) Field of Classification Search
None
See application file for complete search history.

(56) References Cited

U.S. PATENT DOCUMENTS 6,553,072 B1 *  4/2003  Chiang ................. H04N 19/37
                                                           375/240.25
6,553,396 B1 *  4/2003  Fukuhara ........... H03H 17/0266
                                                           708/300
(Continued)

FOREIGN PATENT DOCUMENTS

EP       1720358 A2    11/2006
JP       H08-186827 A   7/1996
(Continued)

OTHER PUBLICATIONS

Voc, Ut-Va, "Motion Compensation on DCT Domain", EURASIP Journal on Advances in Signal Processing (2001) (Year: 2001).*
(Continued)

*Primary Examiner* — Lindsay J Uhl
(74) *Attorney, Agent, or Firm* — Manelli Selter PLLC; Edward J. Stemberger

(57) ABSTRACT

A method of decoding and encoding video, the encoding method comprising: receiving a video; performing a shrink operation on the received video, the shrink operation comprising: creating a first lower resolution video from the video; and sequentially creating additional N−1 lower resolution videos, each one of the additional lower resolution videos created from the preceding lower resolution video; compressing the lowest resolution video; creating a lowest resolution reconstructed video by decompressing the lowest resolution compressed video; performing a first raise operation on the lowest resolution reconstructed video, the first raise operation comprising sequentially creating N higher resolutions reconstructed videos, each one of the higher resolution reconstructed videos created from the preceding lower resolution reconstructed video by: creating a higher resolution video from the lower resolution reconstructed video; computing a residual between the respective lower resolution video and the created higher resolution video;
(Continued)

compressing the computed residual; decompressing the compressed residual; and combining the decompressed residual with the created higher resolution video, yielding the respective higher resolution reconstructed video; and providing a bit stream comprising the lowest resolution compressed video, said compressed residuals and control information.

11 Claims, 20 Drawing Sheets

(51) Int. Cl.
    *H04N 19/33*         (2014.01)
    *H04N 19/117*       (2014.01)
    *H04N 19/59*         (2014.01)

(56) References Cited

U.S. PATENT DOCUMENTS

| | | | |
|---|---|---|---|
| 7,656,950 B2 * | 2/2010 | Garrido | H04N 7/0125 375/240.11 |
| 2003/0021347 A1 | 1/2003 | Lan et al. | |
| 2011/0243222 A1 * | 10/2011 | Choi | H04N 19/159 375/240.03 |
| 2013/0314496 A1 * | 11/2013 | Rossato | H04N 19/63 348/43 |
| 2014/0023291 A1 * | 1/2014 | Lin | G06T 5/003 382/279 |

FOREIGN PATENT DOCUMENTS

| | | |
|---|---|---|
| JP | 2000-244743 A | 9/2000 |
| WO | 20070020230 A2 | 2/2007 |
| WO | 20070036759 A1 | 4/2007 |
| WO | 20100024907 A1 | 3/2010 |

OTHER PUBLICATIONS

Wavelet algorithms for high-resolution image reconstruction. SIAM Journal on Scientific Computing 24.4 (2003): 1408-1432. Retrieved from the Internet: •URL: ftp://ftp.math.culak. edu.hk/report/2000-20.pdf• Chan, Raymond H., et al. Dec. 31, 2013 (Dec. 31, 2013).

Segall C A et al: "Spatial Scalability Within the H.264/AVC Scalable Video Coding Extension", IEEE Trasnactions on Circuits and Sytstems for Video Thchnology, IEEE Service Center, Piscataway, NJ, US, vol. 17, No. 9, Sep. 1, 2007, pp. 1121-1135, XP011193020, ISSN: 1050-8215, DOI: 10.1109/TCSVT.2007.906824.

Hsiang Shin-Ta A: "Antialising spatial scalable subband/wavelet coding using H.264/AVC A", Picture Coding Symposium 2009; May 6, 2009-May 8, 2009; Chicago,, May 6, 2009, XP030081868.

Beong-Jo Kim et al: "Low Bit-Rate Scalable Video Coding with 3-D Set Partitioning in Hierarchical Trees (3-D SPIHT)", IEEE Trasnactions on Circuits and Sytstems for Video Thchnology, IEEE Service Center, Piscataway, NJ, US, vol. 10, No. 8, Dec. 1, 2000, XP011014133, ISSN: 1051-8215.

* cited by examiner $$\begin{bmatrix} Y \\ U \\ V \end{bmatrix} = \begin{bmatrix} 0.2126 & 0.7152 & 0.0722 \\ -0.09991 & -0.33609 & 0.436 \\ 0.615 & -0.55861 & -0.05639 \end{bmatrix} \begin{bmatrix} R \\ G \\ B \end{bmatrix}$$

210 RGB to YUV $$\begin{bmatrix} R \\ G \\ B \end{bmatrix} = \begin{bmatrix} 1 & 0 & 1.28033 \\ 1 & -0.21482 & -0.38059 \\ 1 & -2.12798 & 0 \end{bmatrix} \begin{bmatrix} Y \\ U \\ V \end{bmatrix}$$

220 YUV to RGB

FIG. 2 (PRIOR ART)

610 — $A_0, A_1, A_2, \ldots A_{m-1}$, low pass → high pass

620 — $S_0, S_1, S_2, \ldots S_{m-1}$, low pass → high pass

630 —
$A_0;$ $\begin{bmatrix} \frac{1}{4} & \frac{1}{4} \\ \frac{1}{4} & \frac{1}{4} \end{bmatrix}$ $A_1;$ $\begin{bmatrix} \frac{1}{4} & \frac{1}{4} \\ \frac{1}{4} & \frac{1}{4} \end{bmatrix}$ $A_2;$ $\begin{bmatrix} \frac{1}{4} & \frac{1}{4} \\ \frac{1}{4} & \frac{1}{4} \end{bmatrix}$ $A_3;$ $\begin{bmatrix} \frac{1}{4} & \frac{1}{4} \\ \frac{1}{4} & \frac{1}{4} \end{bmatrix}$ $S_0;$ $\begin{bmatrix} -1 & 1 \\ 1 & -1 \end{bmatrix}$ $S_1;$ $\begin{bmatrix} -1 & 1 \\ 1 & -1 \end{bmatrix}$ $S_2;$ $\begin{bmatrix} -1 & 1 \\ 1 & -1 \end{bmatrix}$ $S_3;$ $\begin{bmatrix} -1 & 1 \\ 1 & -1 \end{bmatrix}$

FIG. 6 (PRIOR ART)

VIDEO COMPRESSION METHOD

CROSS-REFERENCES TO RELATED APPLICATIONS

This patent application claims priority from and is related to U.S. Provisional Patent Application Ser. No. 61/710,723, filed Oct. 7, 2012, this U.S. Provisional Patent Application incorporated by reference in its entirety herein.

TECHNOLOGY FIELD

The present invention is in the field of video compression.

BACKGROUND OF THE INVENTION

Raw video files consume huge amounts of space. For example, a High Definition(HD) movie with 60 frames per second(fps), frame resolution of 1920×1080 pixels, color depth 3, and 8 bits per color, consumes:

1,920*1,080*60*3=373,248,000 Bytes per second.
And two hours of such movie would consume:
373,248,000*7,200=2,687,385,600,000 Bytes≈3 Tera bytes(Tbytes).

To store the movie on regular DVD disks, i.e. 4.7 Giga bytes(Gbytes) disks, we need:

≈2,687/4.7≈600 DVD disks.

And to transmit the movie over the Internet, say over fast 100 Mbps channels, we need:

≈2,687,386*8/100≈2,149,908 seconds≈60 hours.

Video compression is the art of reducing the video size without affecting the perceived quality.

Video content is not always taken with the best equipment and the best photo shooters. In such cases digital image processing, also known as video enhancement, can substantially improve the visible quality of the video, and help the video compression process. Some of the more known methods for video enhancements use video preprocessing tools such as the following:

De-interlacing Interlaced movie can be problematic when recording fast moving objects. The moving object can be in one place in the "even" picture, and in another place in the "odd" one, yielding a "stripped" picture which is very disturbing.

De-blocking Block-like artifacts are the side effect of the current MPEG's low-quality highly compressed videos. De-blocking greatly increases the quality of such videos.

Sharpening emphasizes texture and detail, and is critical when post-processing most digital images. An "unsharp mask" is actually used to sharpen an image.

De-noising Some degree of noise is always present in any electronic device that transmits or receives a "signal". For television this signal is the broadcast data transmitted over cable or received at the antenna; for digital cameras, the signal is the light which hits the camera sensor. Video De-noising is the process of removing noise from a video signal.

Stabilization is used to reduce blurring associated with the motion of camera. Specifically, it compensates for pan and tilt of a camera or other imaging devices. With video cameras, camera shake causes visible frame-to-frame jitter in the recorded video.

Camera Calibration is important in order to get stable and reliable images. Cameras that operate out of sync or are imprecisely adjusted can create blurry or confused images.

Such tools can greatly improve the video quality and help the compression process. Here, we ignore this issue and assumes that the video has already been preprocessed as required. See Ref. [1] for more details.

A digital video consists of multiple streams such as video, audio, and control, that are stored together in the same container file. For example, common containers formats are: AVI (Audio Video Interlaced), WMV (Windows Media Video), FLV (Flash Video), MOV (Apple Quick Time Movie). The video stream itself is usually independent of the other streams, or of the container type, and can be represented in many different formats. A media player, such as Apple iTunes, and Microsoft Windows Media Player, displays the video on the screen, using the corresponding Codec (Encoder/Decoder) software.

The displayed video is usually represented in the raw RGB color space format because the human visual system works in a similar way, i.e., the human eye color vision is based on red, green and blue color sensors. The raw RGB file 100 is schematically depicted in FIG. 1, comprising a header section 120 followed by frames 130. The Header 120 contains the video parameters such as: n—number of rows, m—number of columns, and N—number of frames. A frame 130 contains n*m pixel values, each a triplet for the R, G and B.

The raw YUV color space format is another very useful format for video representation. Here, Y corresponds to the black and white representation of the video, and U and V to the added color differences. There are many similar formulas for converting RGB to YUV and vice versa. One of them, see Ref. [2], is exemplified in FIG. 2, where the RGB to YUV transforming formula is given in unit 210, and the YUV to RGB transforming formula is given in unit 220. The raw YUV file 300 is schematically depicted in FIG. 3, comprising a header section 310 as in unit 120 of FIG. 1, followed by the Y frames 320, the U frames 330, and the V frames 340. Typical frames for the Y, U and V components are shown. In what follows we consider only the video stream part of the container file, and without loss of generality (w.l.g.), we assume a YUV color space representation.

A camera may change its angle of view many times during the movie. These changes of scenes, also called the movie's cuts, are distinguished by their shape and contents, see Ref. [3]. In terms of compression this means that we have little redundancy between the cuts.

The cut file 400 is schematically depicted in FIG. 4, comprising a header section 410 followed by the cuts 420. The header is as follows:

n is the number of rows, m is the number of columns,
N is the number of frames, and M is the number of cuts.

Each cut of the file has the same structure as the YUV file format given in unit 300 of FIG. 3. For simplicity, we will proceed to consider from now on only one such component of each such cut. A generalization to all components is straightforward.

Wavelets and multiwavelets, see Ref. [4], are important mathematical tools that we use in the applications that follow. Classical discrete wavelet transform (DWT) filters are depicted in FIG. 5; a pair of low pass and high pass analysis filters are depicted in unit 510, and a pair of low pass and high pass synthesis filters are depicted in unit 520. For example, the one dimensional Haar transform is depicted in unit 530.

In general, we have m>1 filters, as depicted in FIG. 6; the analysis filters are depicted in unit 610, and the synthesis filters in unit 620. For example, a 2D Haar transform is depicted in unit 630. More generally, the filters may refer to the discrete multiwavelet transform (DMWT).

The lattice of integers $\mathbb{Z}^n$ is the set of n-tuples of integers in the Euclidean space $\mathbb{R}^n$. A frame can be represented as a rectangular grid on the lattice $\mathbb{Z}^2$, and a video as a cubic grid on $\mathbb{Z}^3$. A subset of a lattice, which is itself a lattice is called a sub-lattice. Examples of sub-lattices of $\mathbb{Z}^2$ are given in FIG. 7. The Quincunx sub-lattices are depicted in unit 710. The white circled points correspond to the even sub-lattice, and the dark circled points to the odd sub-lattice. The Dyadic sub-lattices are similarly depicted in unit 720. The Quincunx sub-lattices are determined by the dilation matrix of unit 715, and the Dyadic sub-lattices by the dilation matrix of unit 725. The number of sub-lattices is determined by the determinant of the corresponding dilation matrix, 2 in the Quincunx case, and 4 in the Dyadic case. Down-sampling refers to the process of extracting a sub-lattice from a given lattice. For example, we display a dyadic down sampling in FIG. 8. The input signal is given in unit 810, a temporal down sampling in unit 820, a spatial down sampling in unit 830, and a combined spatial and temporal down sampling in unit 840.

SUMMARY OF THE INVENTION

According to an aspect of the present invention there is provided a method of encoding video, comprising: receiving a video; performing a shrink operation on said received video, said shrink operation comprising: creating a first lower resolution video from said video; and sequentially creating additional N−1 lower resolution videos, each one of said additional lower resolution videos created from said preceding lower resolution video; compressing the lowest resolution video; creating a lowest resolution reconstructed video by decompressing said lowest resolution compressed video; performing a first raise operation on said lowest resolution reconstructed video, said first raise operation comprising sequentially creating N higher resolutions reconstructed videos, each one of said higher resolution reconstructed videos created from said preceding lower resolution reconstructed video by: creating a higher resolution video from said lower resolution reconstructed video; computing a residual between said respective lower resolution video and said created higher resolution video; compressing said computed residual; decompressing said compressed residual; and combining said decompressed residual with said created higher resolution video, yielding the respective higher resolution reconstructed video; and providing a bit stream comprising said lowest resolution compressed video, said compressed residuals and control information comprising said N.

The bit stream may comprise low pass analysis filters and wherein creating a lower resolution video comprises applying a low pass analysis filter to a video.

The bit stream may comprise blurring and down sampling operators and wherein creating a lower resolution video comprises applying a blurring operator to a video and applying a down sampling operator to the blur operation result.

The bit stream may comprise blurring and down sampling operators and wherein said low pass analysis filters are computed from said blurring and down sampling operators.

The bit stream may comprise low pass synthesis filters and wherein creating a higher resolution video comprises applying a low pass synthesis filter to a lower resolution reconstructed video.

The bit stream may comprise up sampling, interpolation, oracle and deblurring operators and wherein creating a higher resolution video comprises: a. applying an up sampling operator followed by an interpolation operator to a lower resolution reconstructed video; b. applying an oracle operator to the interpolation operation result; and c. applying a deblurring operator to the oracle operation result.

The bit stream may comprise up sampling, interpolation, oracle and deblurring operators and the low pass synthesis filters may be computed from said up sampling, interpolation, oracle and deblurring operators.

Computing a residual may comprise calculating the difference between the respective lower resolution video and the higher resolution video.

The bit stream may comprise high pass analysis filters and computing the residuals may additionally comprise applying high pass analysis filters to the calculated difference.

The high pass analysis filters may be computed from said calculated difference.

Computing the higher resolution reconstructed video may comprise adding the decompressed residual to the higher resolution video.

The bit stream may comprise high pass synthesis filters and creating the higher resolution reconstructed video may comprise applying the high pass synthesis filters to the respective decompressed residuals and adding the results to the higher resolution video.

The high pass synthesis filters may be computed from low pass and high pass analysis filters and low pass synthesis filters.

According to another aspect of the present invention there is provided a method of decoding a video encoded according to the above method, comprising: receiving and processing said bit stream comprising said lowest resolution compressed video, said compressed residuals and said control information; creating a lowest resolution reconstructed video by decompressing said lowest resolution compressed video; and performing a second raise operation on said lowest resolution reconstructed video, said second raise operation comprising sequentially creating N higher resolutions reconstructed videos, each one of said higher resolution reconstructed videos created from said preceding lower resolution reconstructed video by: creating a higher resolution video from said lower resolution reconstructed video; decoding the residual between said respective lower resolution video and said created higher resolution video; and combining said decoded residual with said created higher resolution video, yielding the respective higher resolution reconstructed video.

The bit stream may comprise low pass synthesis filters and creating a higher resolution video may comprise applying a low pass synthesis filter to a lower resolution reconstructed video.

The bit stream may comprise up sampling, interpolation, oracle and deblurring operators and creating a higher resolution video may comprises: a. applying an up sampling operator followed by an interpolation operator to a lower resolution reconstructed video; b. applying an oracle operator to the interpolation operation result; and c. applying a deblurring operator to the oracle operation result.

The bit stream may comprise up sampling, interpolation, oracle and deblurring operators and the low pass synthesis filters may be computed from said up sampling, interpolation, oracle and deblurring operators.

Computing the higher resolution reconstructed video may comprise adding the decompressed residual to the higher resolution video.

The bit stream may comprise high pass synthesis filters and creating the higher resolution reconstructed video may comprise applying the high pass synthesis filters to the respective decompressed residuals and adding the results to the higher resolution video.

The high pass synthesis filters may be computed from low pass and high pass analysis filters and low pass synthesis filters.

According to another aspect of the present invention there is provided a video codec comprising: an encoding unit configured to encode a video; a reconstructing unit configured to reconstruct said encoded video, the reconstructing unit creating a bit stream of decoding data; and a decoding unit configured to receive the bit stream of decoding data and decode the video therewith.

The encoding unit may be configured to: receive a video; perform a shrink operation on said received video, said shrink operation comprising: creating a first lower resolution video from said video; sequentially creating additional N−1 lower resolution videos, each one of said additional lower resolution videos created from said preceding lower resolution video; and compressing the lowest resolution video.

The reconstructing unit may be configured to: create a lowest resolution reconstructed video by decompressing said lowest resolution compressed video;

perform a first raise operation on said lowest resolution reconstructed video, said first raise operation comprising sequentially creating N higher resolutions reconstructed videos, each one of said higher resolution reconstructed videos created from said preceding lower resolution reconstructed video by: creating a higher resolution video from said lower resolution reconstructed video; computing a residual between said respective lower resolution video and said created higher resolution video; compressing said computed residual; decompressing said compressed residual; and combining said decompressed residual with said created higher resolution video, yielding the respective higher resolution reconstructed video; wherein said bit stream comprises said compressed lowest resolution video, said compressed residuals and control information comprising said N.

The decoding unit may be configured to: receive and process said bit stream comprising said lowest resolution compressed video, said compressed residuals and said control information; create a lowest resolution reconstructed video by decompressing said lowest resolution compressed video; and perform a second raise operation on said lowest resolution reconstructed video, said second raise operation comprising sequentially creating N higher resolutions reconstructed videos, each one of said higher resolution reconstructed videos created from said preceding lower resolution reconstructed video by: creating a higher resolution video from said lower resolution reconstructed video; decoding the residual between said respective lower resolution video and said created higher resolution video; and combining said decoded residual with said created higher resolution video, yielding the respective higher resolution reconstructed video.

According to another aspect of the present invention there is provided a method of decoding a video encoded according to the method above, wherein said decoding unit is configured to analyze said reconstructed higher resolution videos.

The decoding unit may be configured to compute the motion field of said reconstructed videos.

The decoding unit may configured to perform object recognition of said reconstructed videos.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2 describes the transforms between the RGB and YUV formats;

FIG. 6 describes the m-way Discrete Wavelet Transform Filters;

DETAILED DESCRIPTION OF THE INVENTION

The present invention provides a new technology for video compression that unlike the standard MPEG methods such as H.264, benefits from the analysis of the video in both the Encoder and the Decoder, using state of the art computer vision and mathematical methods. For example, motion field calculation and object recognition, see Ref. [1] and [7], may be used to reconstruct the video in both the Encoder and the Decoder.

Figure 1:
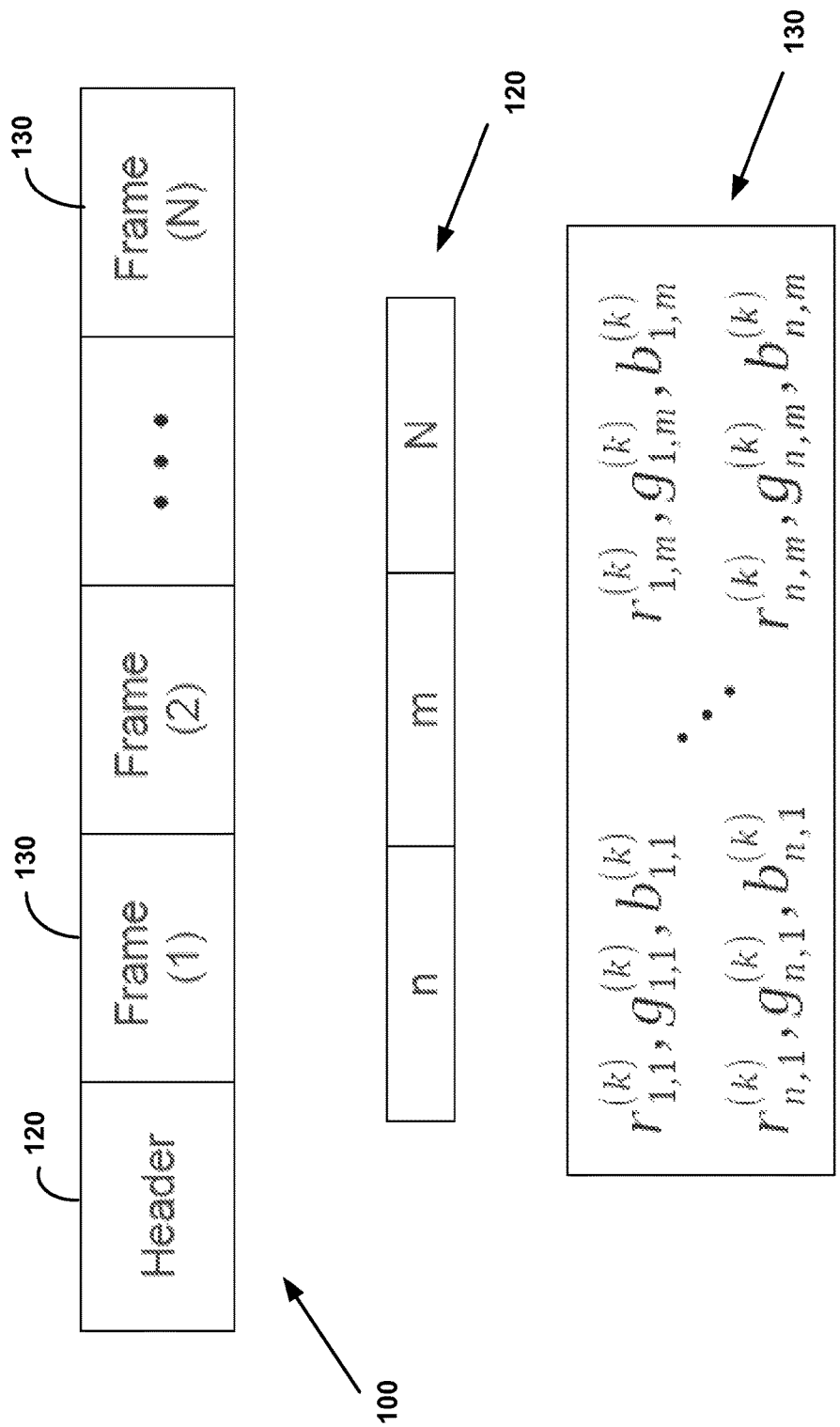
FIG. 1 describes the raw RGB file.
Figure 3:
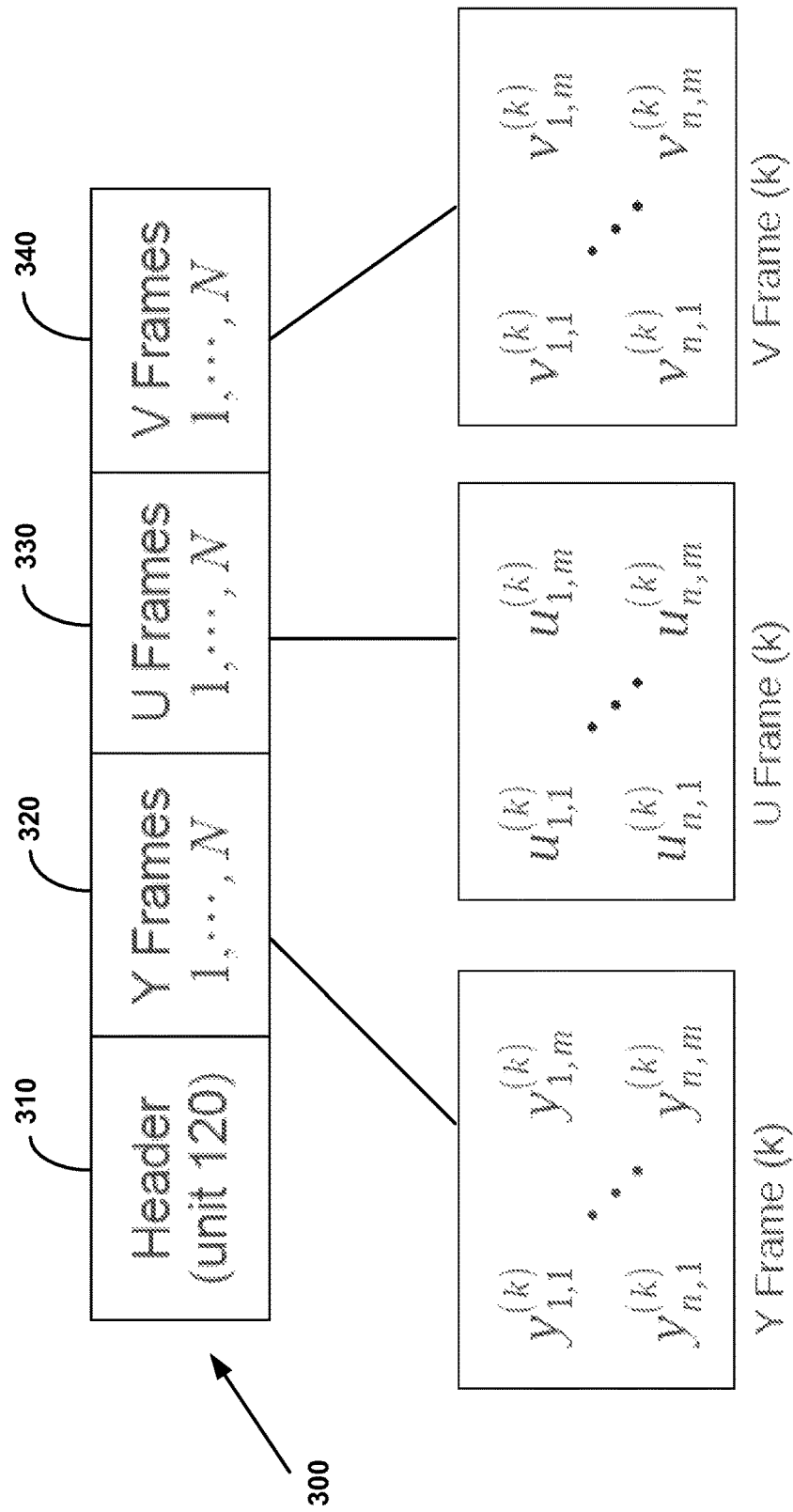
FIG. 3 describes the raw YUV file.
Figure 4:
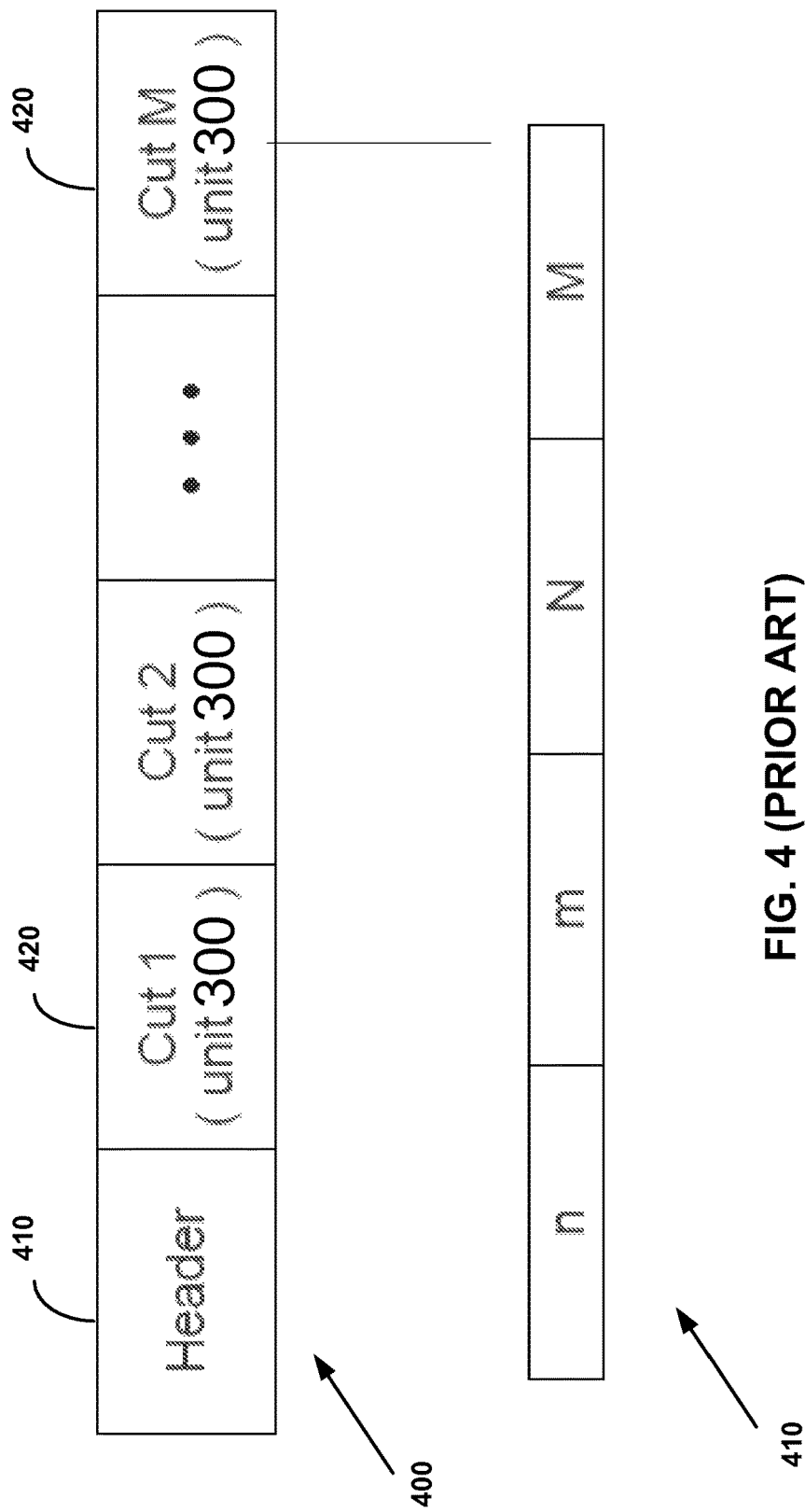
FIG. 4 describes the cut file.
Figure 5:
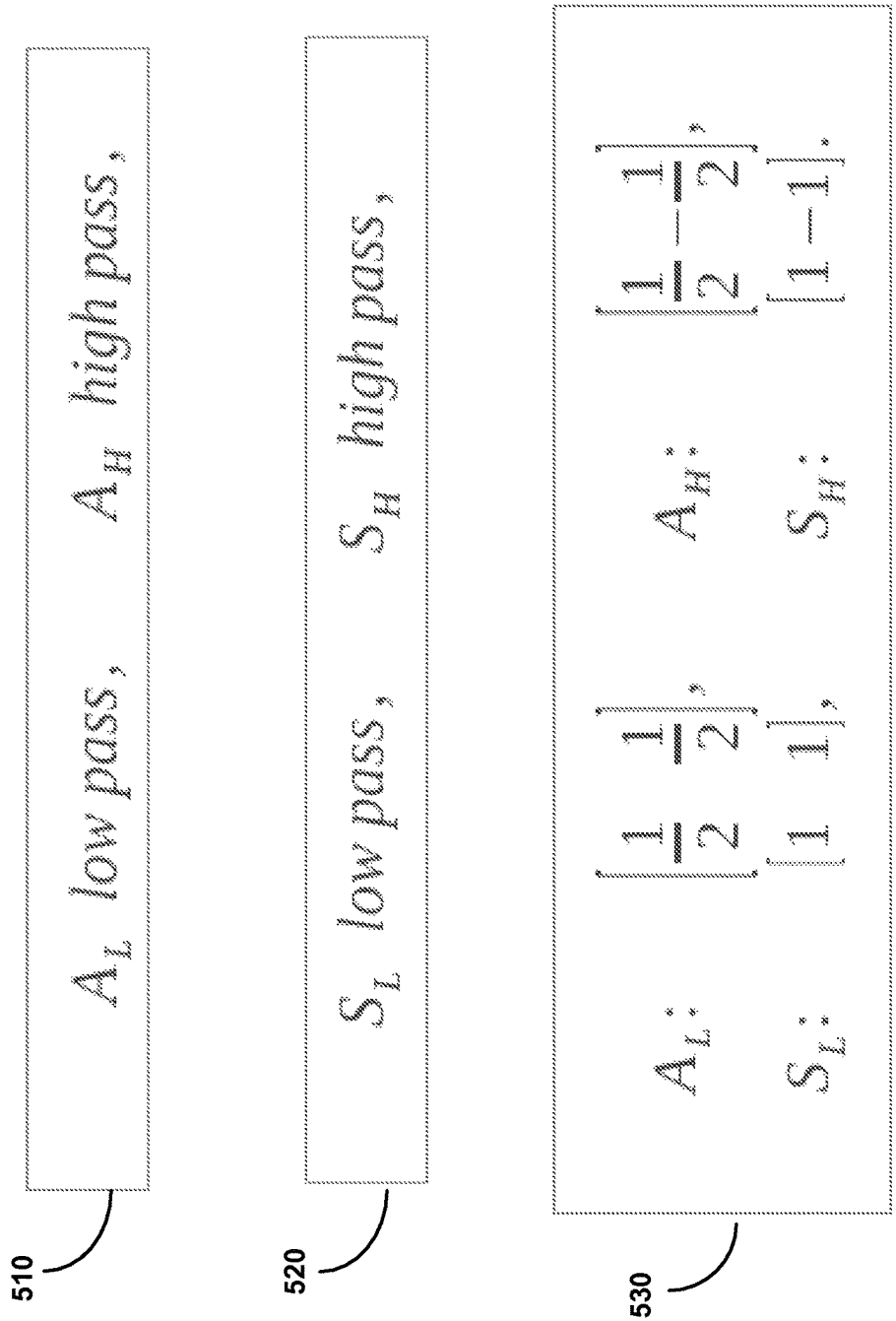
FIG. 5 describes the 2-way Discrete Wavelet Transform Filters.
Figure 7:
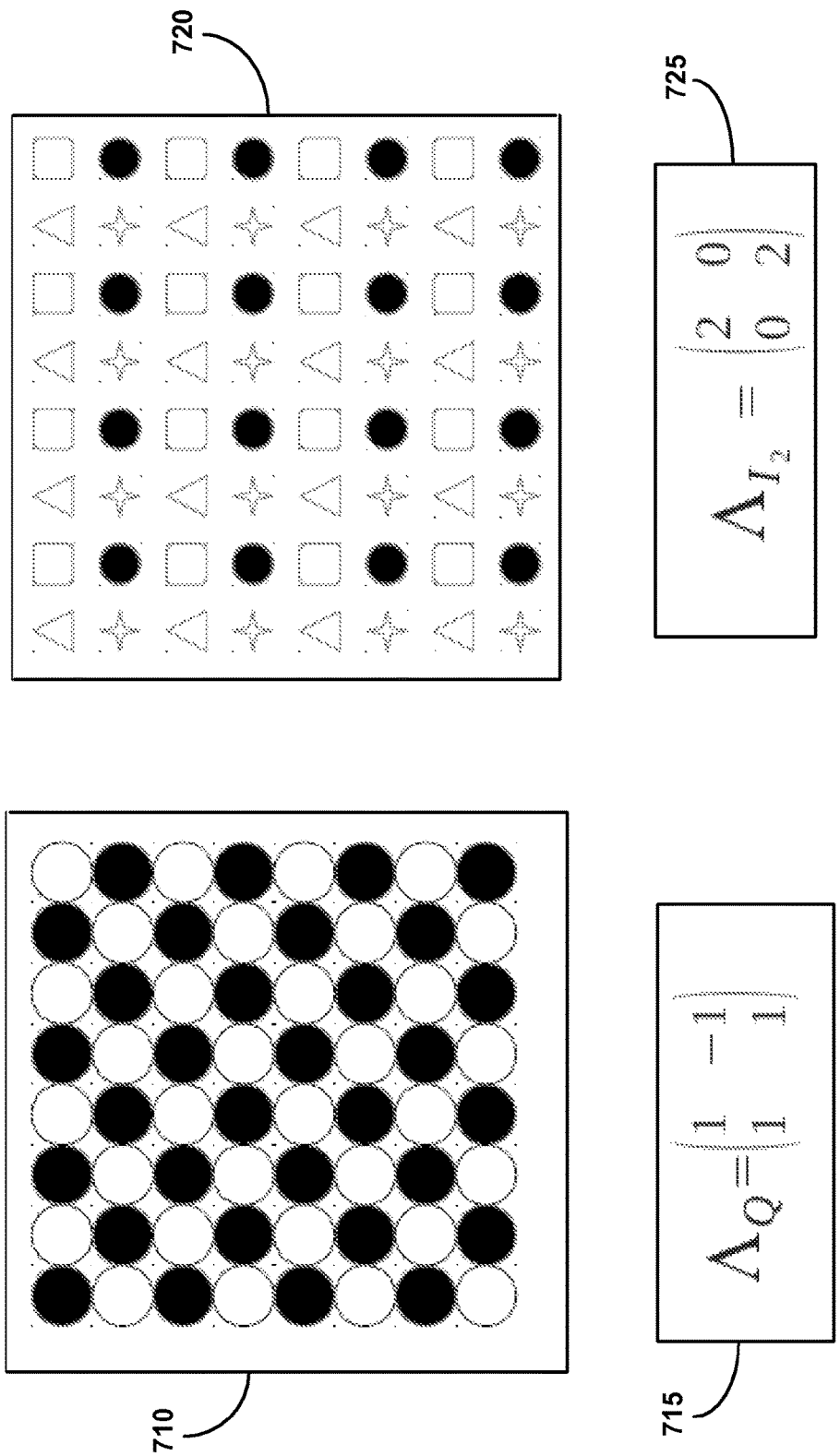
FIG. 7 depicts Lattices and sub-lattices.
Figure 8:
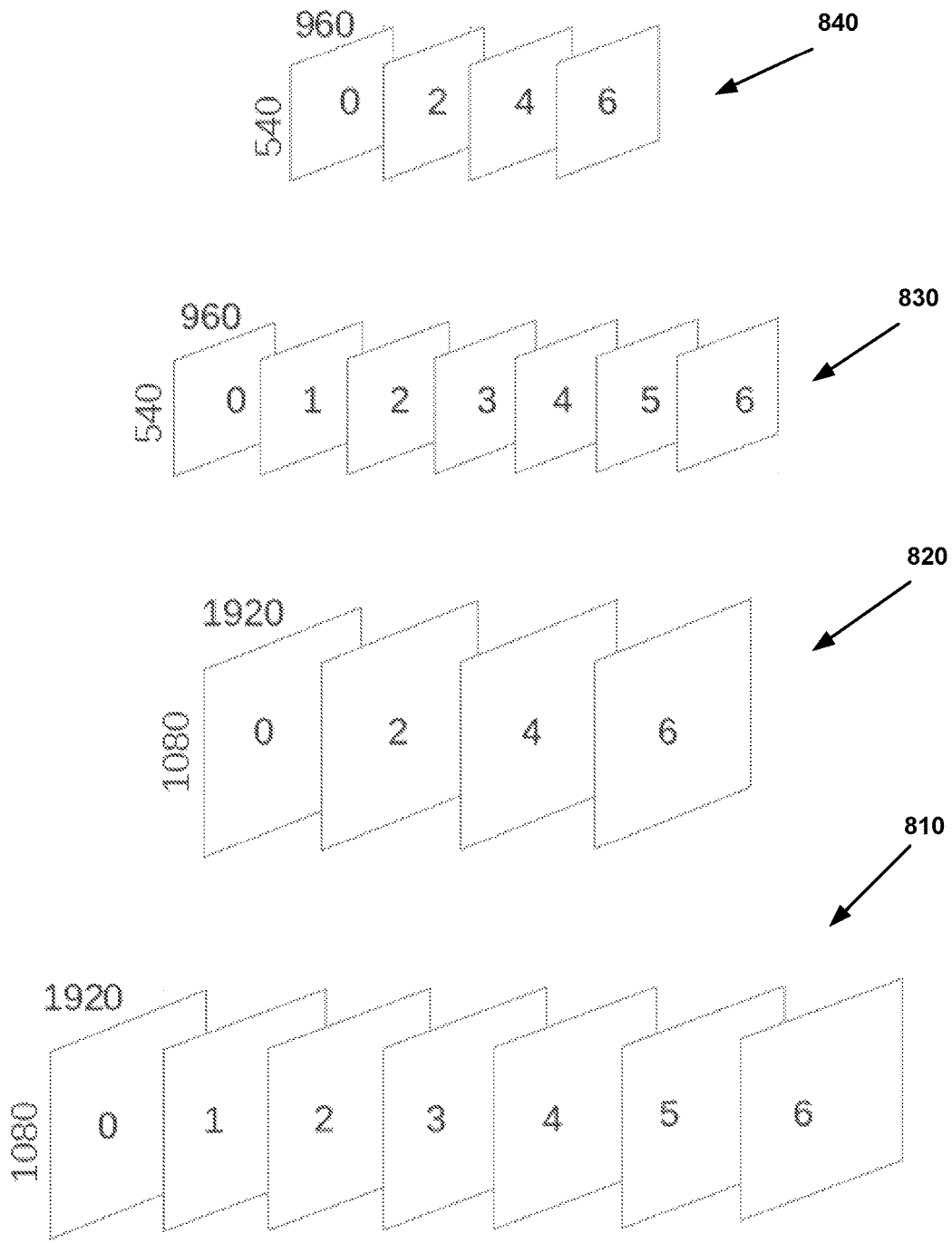
FIG. 8 describes Dyadic Down Sampling.
Figure 9:
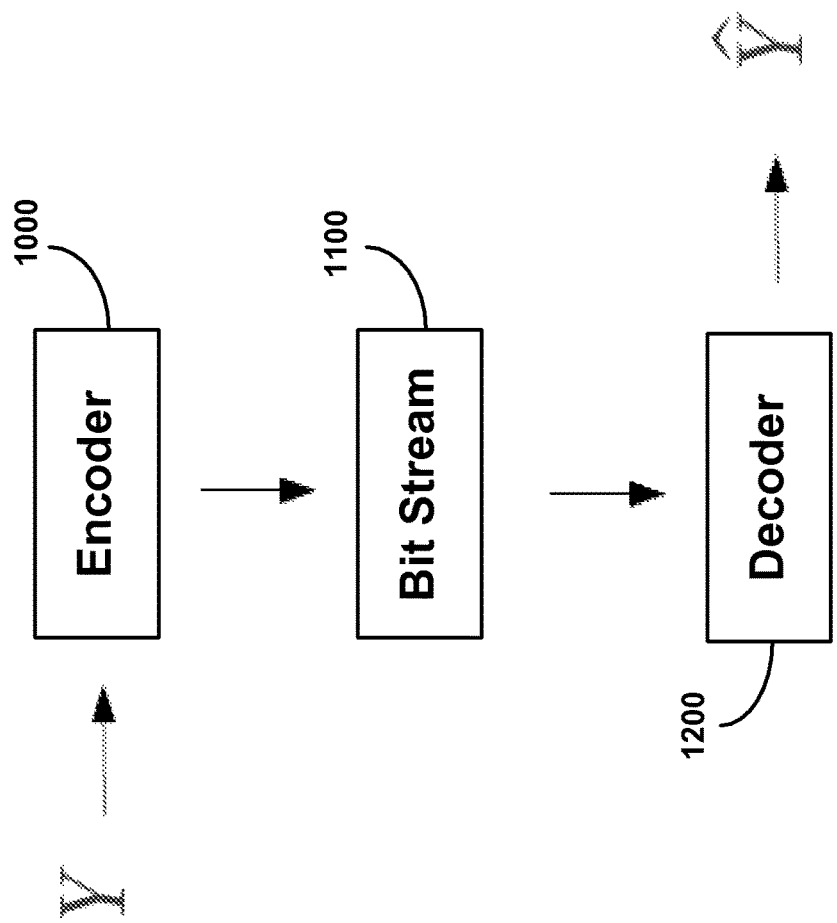
FIG. 9 is a flowchart of the new Codec.

A schematic diagram of the new generic Codec is depicted in FIG. 9. The Codec consists of two main parts: The Encoder and the Decoder. The Encoder 1000 compresses the video Y into the Bit Stream 1100, and the Decoder 1200 decompresses the Bit Stream into the reconstructed video $\hat{Y}$. The Bit Stream 1100, which is the output from the Encoder and the input to the Decoder, represents the compressed video. The Bit Stream can be stored on disk or transmitted over a network. Both Y and $\hat{Y}$ are referred to as "video" throughout the following description. Note that Y is a component of a cut as explained above.

Figure 10:
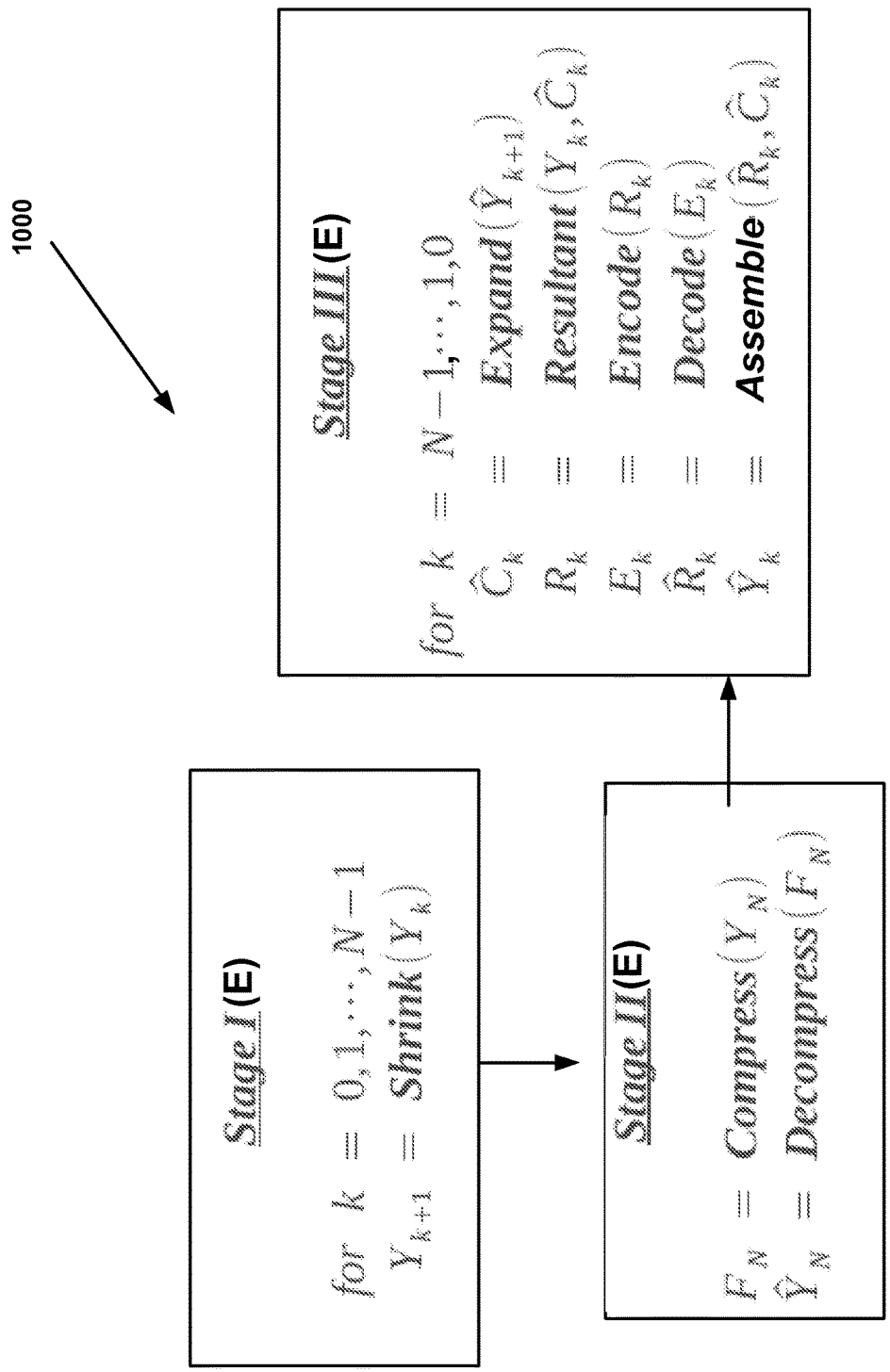
FIG. 10 is a flowchart of the Encoder.
Figure 11:
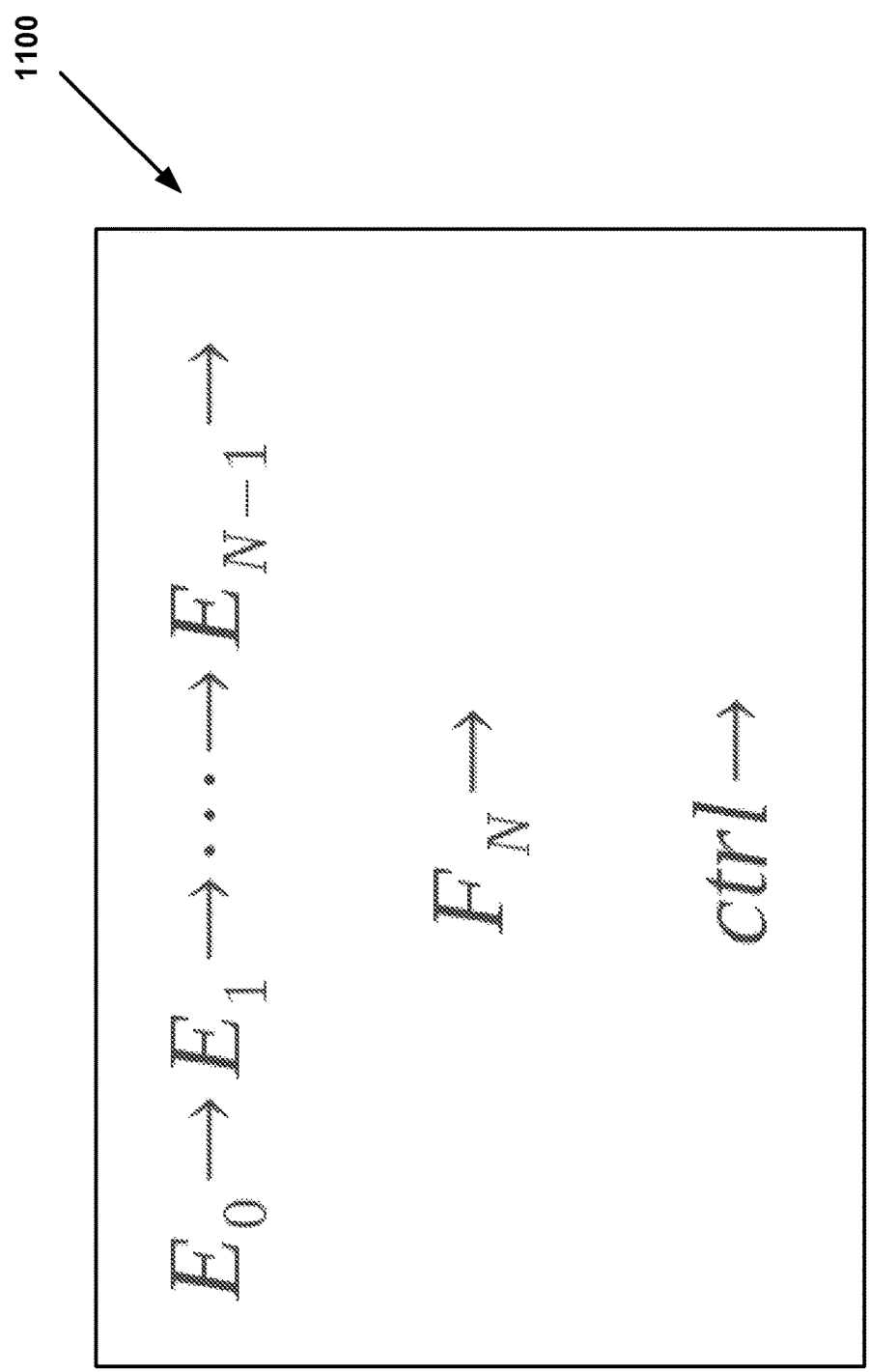
FIG. 11 depicts the Bit Stream.
Figure 12:
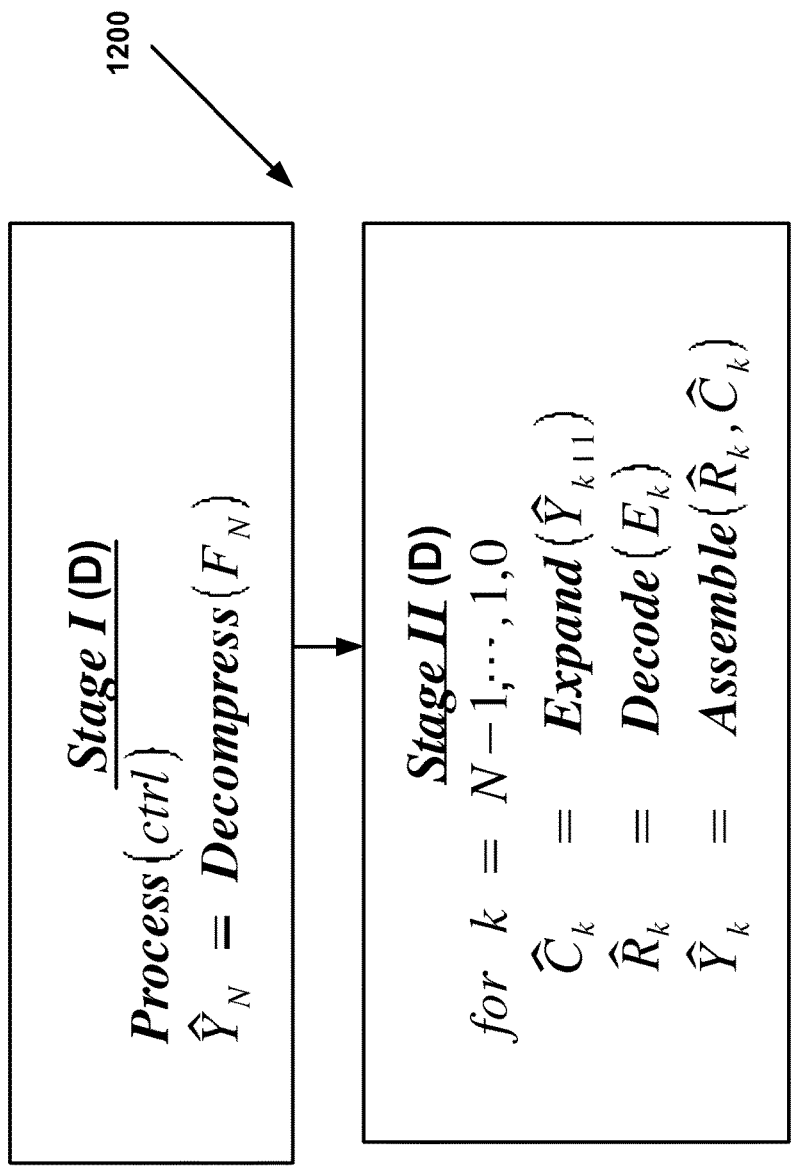
FIG. 12 is a flowchart of the Decoder.

In what follows we describe the Encoder 1000 see FIG. 10, the Bit Stream 1100 see FIG. 11, and the Decoder 1200, see FIG. 12.

The Encoder 1000 has three stages as follows:

Stage I (E) consists of N iterations as follows:

Let us define $Y_0$ ? Y. Then video $Y_k$ is the input to iteration k=0, . . . , N−1, and video $Y_{k+1}$ is the output of iteration k=0, . . . , N−1. Here, video $Y_{k+1}$ is a lower resolution, coarser representation, of video $Y_k$. Lower resolution meaning either spatial lower resolution, temporal lower resolution, or both spatial and temporal lower resolutions. We call this operation of lowering the video resolution the Shrink operation. The number of such iterations, namely N, is determined by the Encoder.

Stage II (E) consists of the Compress and Decompress operations. The Compress operation refers to any method for compressing video as discussed for example in Pat. [1]. The Decompress operation refers to the opposite operation of reconstructing the original video from the compressed video. Let $Y_N$ denote the resulting video after Stage I (E), then we denote the compressed video by $F_N$, and the decompressed video by $\hat{Y}_N$. Note that video $\hat{Y}_N$ is a reconstruction of the video $Y_N$ hampered by the quality of the compression method. In case of a lossless compression, the reconstructed video $\hat{Y}_N$ would be exactly the same as $Y_N$. However, in practice, the compression process is lossy, and $\hat{Y}_N$ is not the same as $Y_N$. Usually, the stronger the compression is, the more the videos differ, and the more distortion exists. A good compression method keeps the viewing quality of the reconstructed video while minimizing the size of the compressed video. Note further that the compressed video $F_N$ gets included in the Bit Stream 1100.

Stage III (E) consists of a first raise operation comprising N backward iterations as follows:

In iteration k=N−1, . . . , 0, the reconstructed video $\hat{Y}_{k+1}$ from the previous iteration (or stage in case of k=N−1), is the input, and the output is the reconstructed video $\hat{Y}_k$, which is of the same resolution (spatial and temporal) as video $Y_k$. Hence, the final video $\hat{Y}_0$ is the reconstruction of the initial video $Y_0$, see Stage I (E) above.

In order to obtain $\hat{Y}_k$ we do the following steps:

1) First, we resize video $\hat{Y}_{k+1}$ into a higher resolution video $\hat{C}_k$, of the same resolution as that of video $Y_k$. We call this operation of raising the video resolution the Expand operation.

2) Next, we compute a residual $R_k$ between video $Y_k$ and the expanded video $\hat{C}_k$. We call this operation of computing the residual the Resultant operation.

3) Finally, we compress the residual $R_k$ into $E_k$. Here, again, by compression, we mean any valid compression method as was discussed in Stage II (E) above. We call this operation of compressing the residual the Encode operation. Note further that the compressed residual $E_k$ gets included into the Bit Stream 1100.

The next steps of the Encoder simulate the operations done at the Decoder:

4) We decompress the compressed residual $E_k$ into the reconstructed residual $\hat{R}_k$. We call this operation of decompressing the compressed residual the Decode operation.

5) We combine the expanded video $\hat{C}_k$ with the reconstructed residual $\hat{R}_k$ to get the reconstructed video $\hat{Y}_k$. We call this operation of combining the expanded video with the reconstructed residual the Assemble operation. The Assemble operation is in a sense the reverse of the Resultant operation.

The Bit Stream 1100 contains the following components:

The ctrl, the additional information known to the Encoder but unknown at the Decoder, which is needed in order to decompress the Bit Stream. For example, the number of iterations N, which is determined by the Encoder is part of the ctrl. Note further that ctrl is transmitted in a compressed form.

The compressed video $F_N$.

The compressed residuals: $E_k$, k=N−1, . . . , 0.

The Decoder 1200 has two stages as follows:

Stage I (D) consists of the Process and Decompress operations. The Process operation retrieves the ctrl information and sets the necessary parameters, such as for example the number of iterations N, required for decoding. The Decompress operation decompresses $F_N$ into the video $\hat{Y}_N$, as is done in Stage II (E) of the Encoder.

Stage II (D) consists of a second raise operation comprising N backward iterations as follows:

In iteration k=N−1, . . . , 0, the reconstructed video $\hat{Y}_{k+1}$ from the previous iteration (or stage in case of k=N−1), is the input, and the output is the reconstructed video $\hat{Y}_k$. This is done in the following way (see also Stage III (E) of the Encoder):

1) Use the Decode operation to decompress the compressed residual $E_k$ into the reconstructed residual $\hat{R}_k$.

2) Use the Assemble operation to combine the expanded video $\hat{C}_k$ with the reconstructed residual $\hat{R}_k$ to get the reconstructed video $\hat{Y}_k$.

To further clarify the invention, we describe hereby some possible implementations of the generic Codec. These are the M Codec, the O Codec, and the OM Codec. Note, however, that many other implementations are also possible and are not excluded by these examples.

EXAMPLE I

The Multiwavelet (M) Codec

Figure 13:
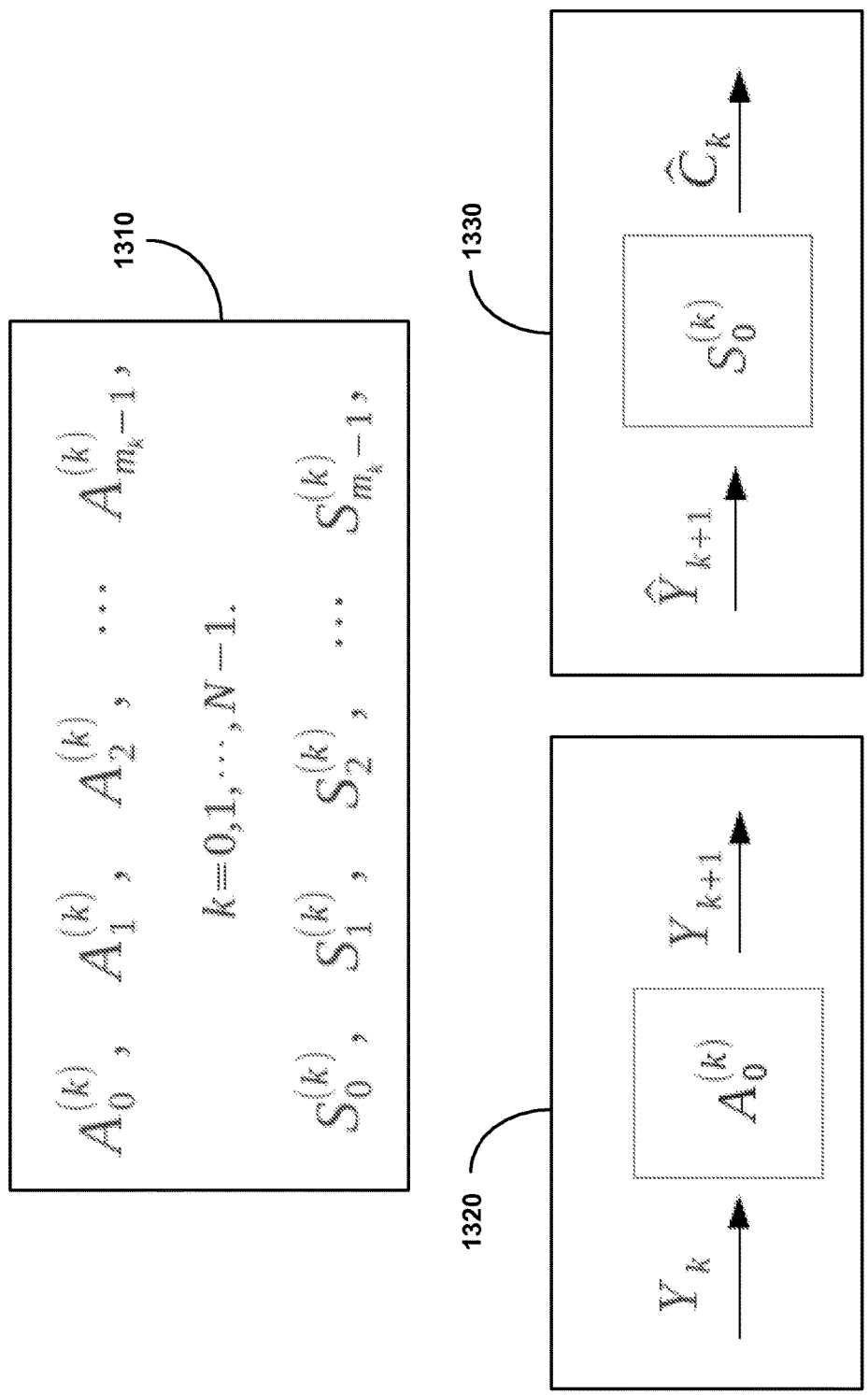
FIG. 13 describes the M Codec.

The M Codec is governed by a respective set of $m_k$ multiwavelet filters, so called the DMWT filters, as depicted in unit 1310 of FIG. 13. Their role is explained in the following.

In the Encoder 1000:

Stage I (E) At iteration k=0, . . . , N−1, the Shrink operation is determined by the low pass analysis filter $A_0^{(k)}$. That is, we apply filter $A_0^{(k)}$ to $Y_k$ to get $Y_{k+1}$, see unit 1320 of FIG. 13.

Stage II (E) is general as before.

Stage III (E) At iteration k=N−1, . . . , 0:

1) The Expand operation is determined by the low pass synthesis filter $S_0^{(k)}$. That is, we apply filter $S_0^{(k)}$ to $\hat{Y}_{k+1}$ to get $\hat{C}_k$, see unit 1330 of FIG. 13.

Figure 14:
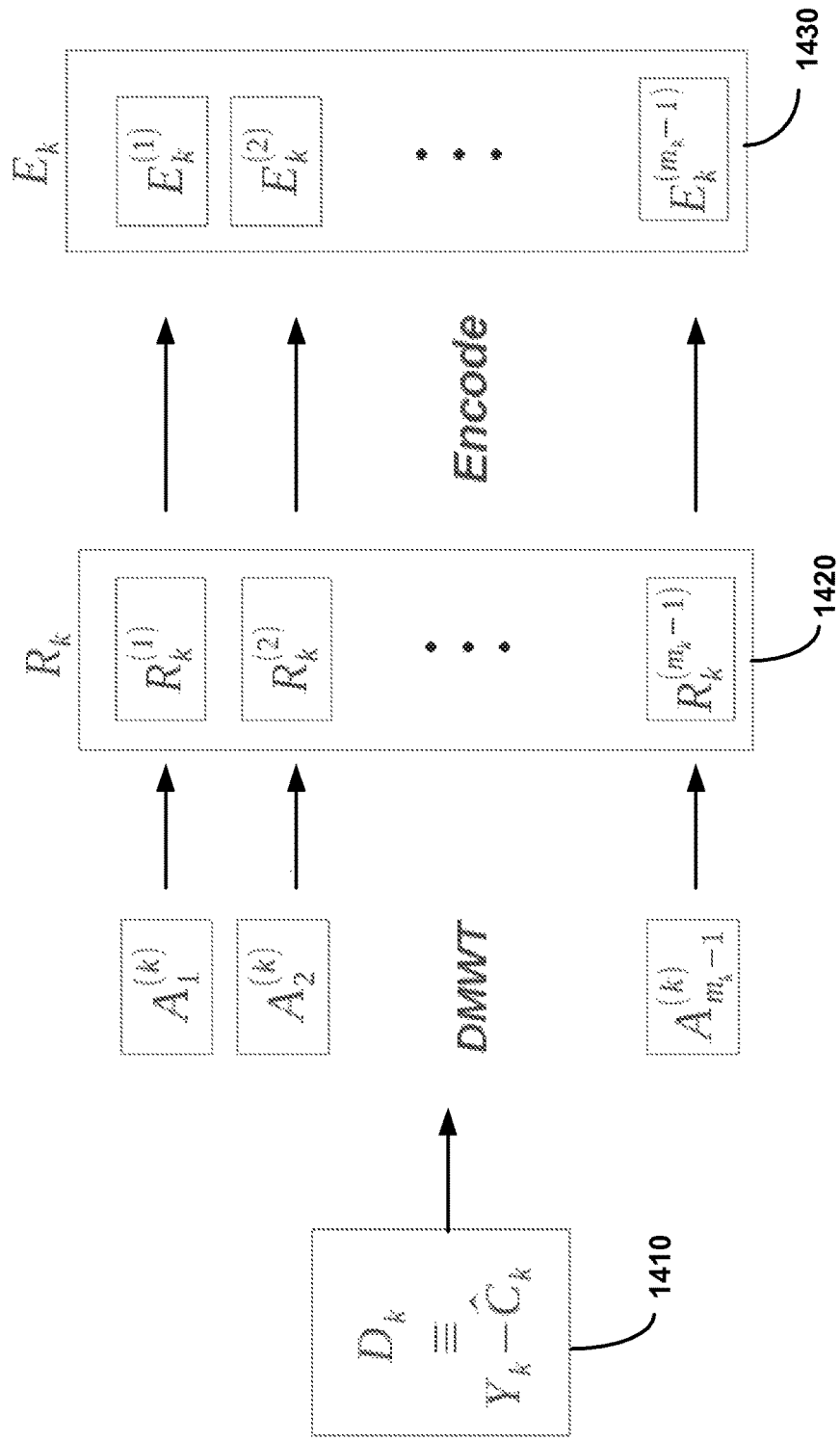
FIG. 14 describes the M Codec.

2) The Resultant operation is determined by the $m_k$ ? 1 high pass analysis filters $A_1^{(k)}, A_2^{(k)}, ?, A_{m_k-1}^{(k)}$:

First the difference between $Y_k$ and $\hat{C}_k$, namely $D_k$, is computed, see unit 1410 of FIG. 14.

Then, for j=1, . . . , $m_k$ ? 1, we apply $A_j^{(k)}$ to $D_k$ to get the respective residual component $R_k^{(j)}$, see unit 1420.

3) We Encode the residuals $R_k^{(j)}$ to $E_k^{(j)}$ for j=1, . . . , $m_k$ ? 1, see unit 1430.

Figure 15:
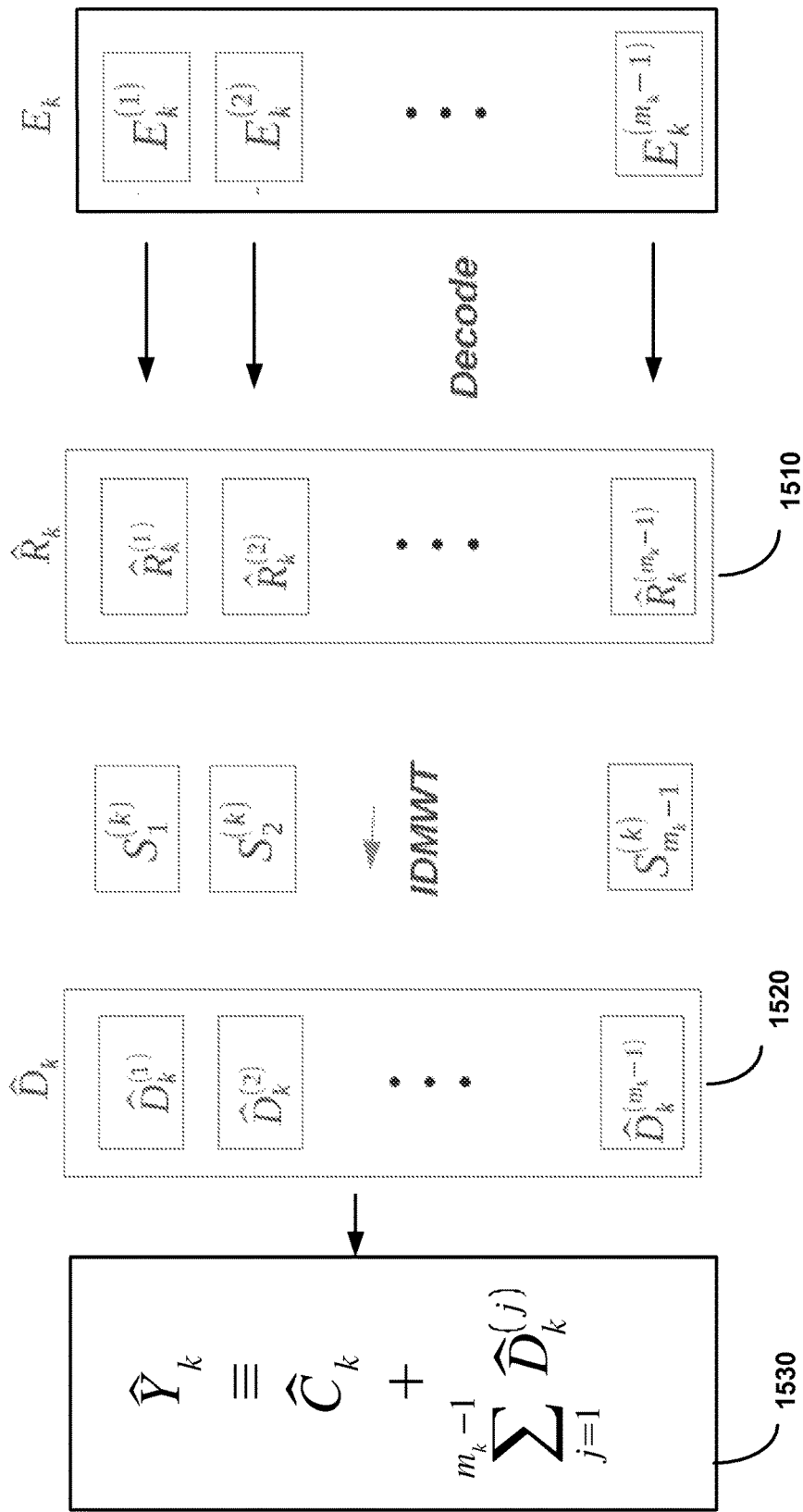
FIG. 15 describes the M Codec.

4) We Decode the reconstructed residuals $\hat{R}_k^{(j)}$ from $E_k^{(j)}$, for j=1, . . . , $m_k$ ? 1, see unit 1510 of FIG. 15.

5) The Assemble operation is determined by the $m_k$ ? 1 high pass synthesis filters: $S_1^{(k)}, S_2^{(k)}, ?, S_{m_k-1}^{(k)}$:

For j=1, . . . , $m_k$ ? 1, we apply $S_j^{(k)}$ to $\hat{R}_k^{(j)}$ to get component $\hat{D}_k^{(j)}$, see unit 1520.

Then we reconstruct $\hat{Y}_k$ by summing up:
$\hat{Y}_k = \hat{C}_k + \Sigma_{j=1}^{m_k-1} \hat{D}_k^{(j)}$ see unit 1530.

In the Bit Stream 1100:
the ctrl information contains the DMWT filters in addition to N.

In the Decoder 1200:
Stage I (D) consists of the Process and Decompress operations, as before.

Stage II (D) At iteration k=N−1, . . . , 0:
1) We Decode the reconstructed residuals $\hat{R}_k^{(j)}$ from $E_k^{(j)}$, for j=1, . . . , $m_k$ ? 1, see unit 1510.
2) We use the Assemble operation as in Stage III (E) above to reconstruct video $\hat{Y}_k$. That is, as in step 5 above, we apply $S_j^{(k)}$ to $\hat{R}_k^{(j)}$ to get components $\hat{D}_k^{(j)}$, and sum up these components with $\hat{C}_k$ to get video $\hat{Y}_k$, see units 1520 and 1530.

EXAMPLE II

The Oracle (O) Codec

Figure 16:
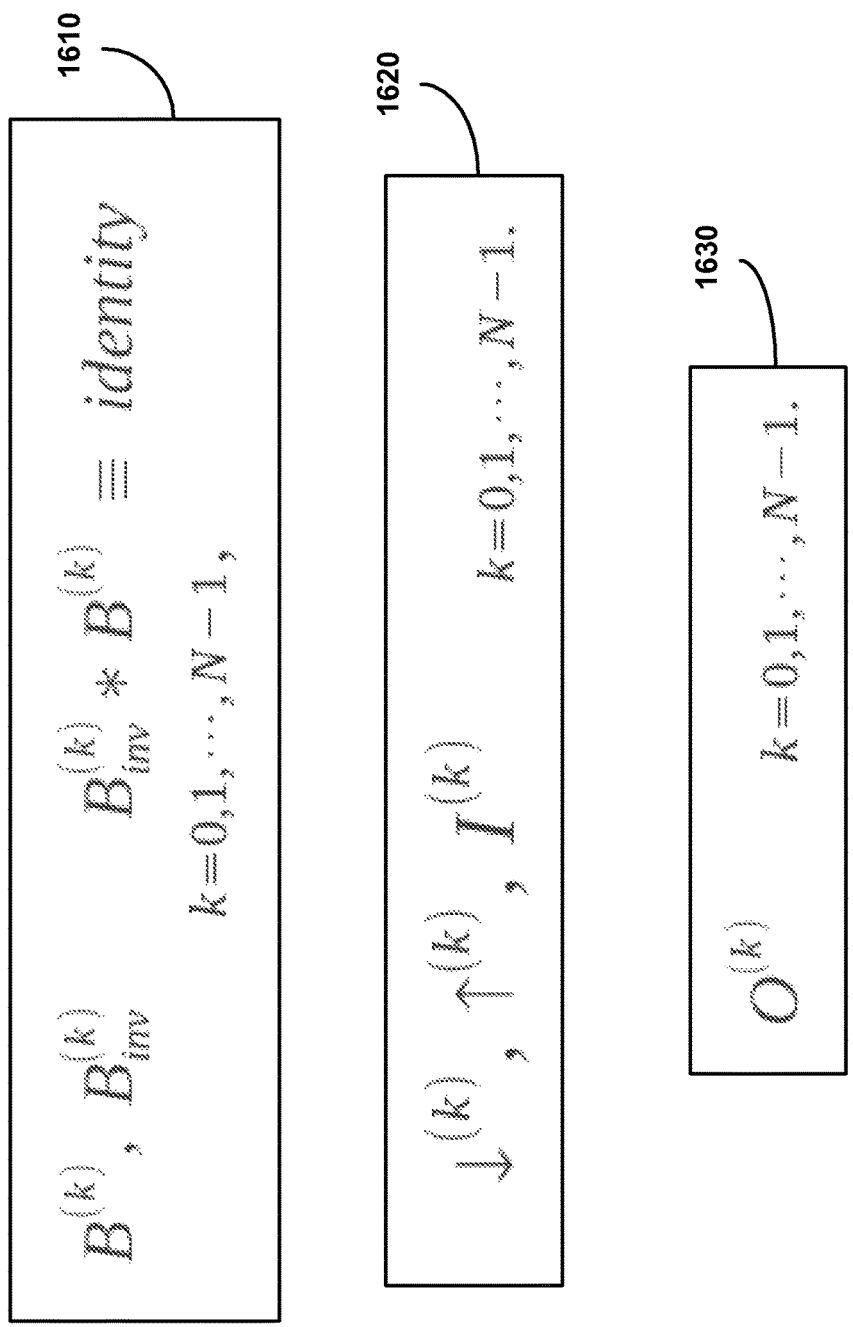
FIG. 16 describes the O Codec parameters.

The O Codec is governed by a respective set of parameters, see FIG. 16. The set includes blurring/deblurring inverse operators, see unit 1610, down sampling/up sampling opposite operators and interpolation operators, see unit 1620, and oracle operators, see unit 1630. Their role is described in the following.

Figure 17:
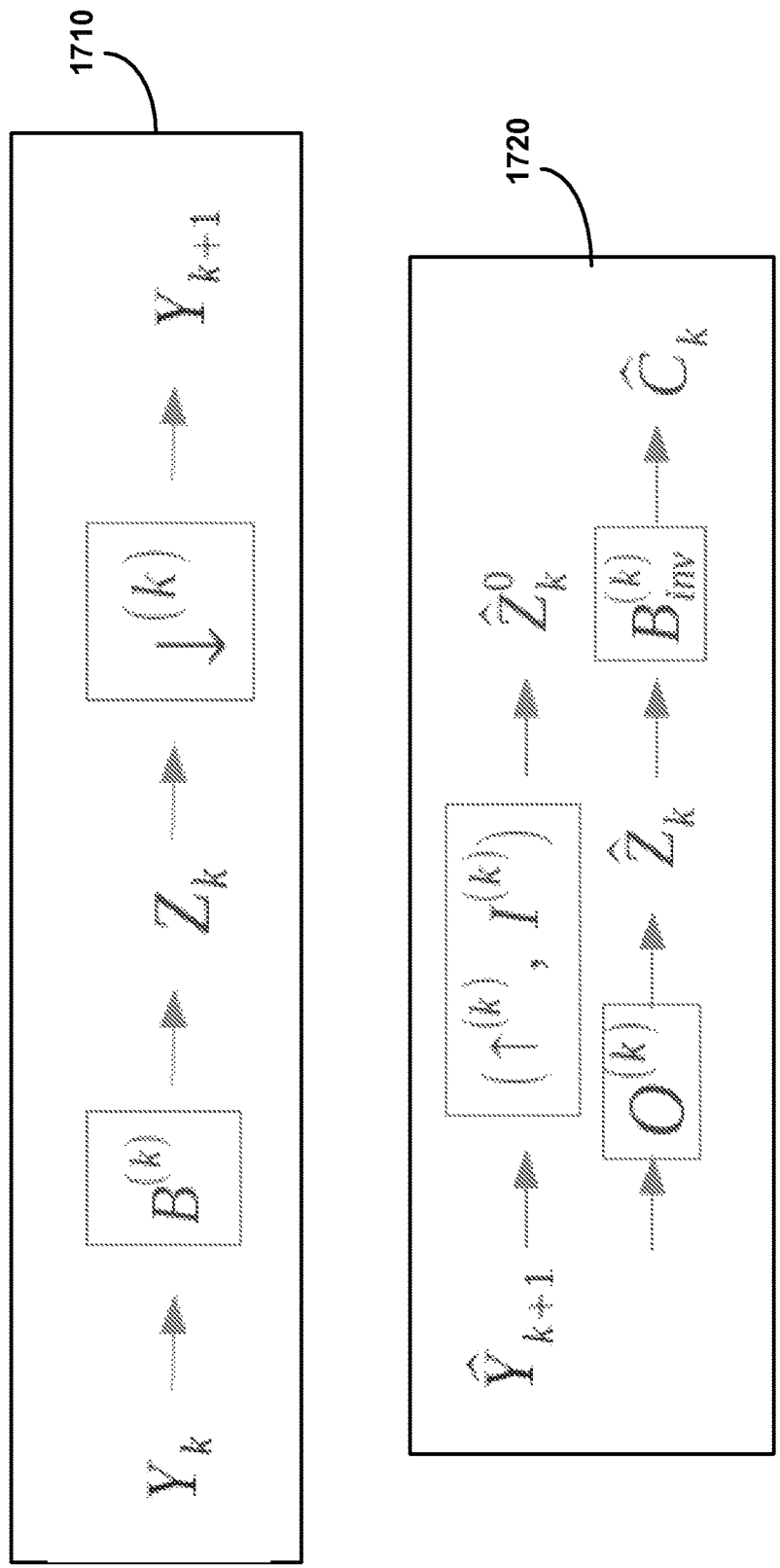
FIG. 17 describes the O Codec.

In the Encoder 1000:
Stage I (E) At iteration k=0, . . . , N−1:
The Shrink operation is determined by the respective blurring and down sampling operators. That is, we apply the blurring operator $B^{(k)}$ to $Y_k$ yielding $Z_k$, and then the down sampling operator $?^{(k)}$ to $Z_k$, yielding $Y_{k+1}$, see unit 1710 of FIG. 17.

Stage II (E) is general as before.

Figure 18:
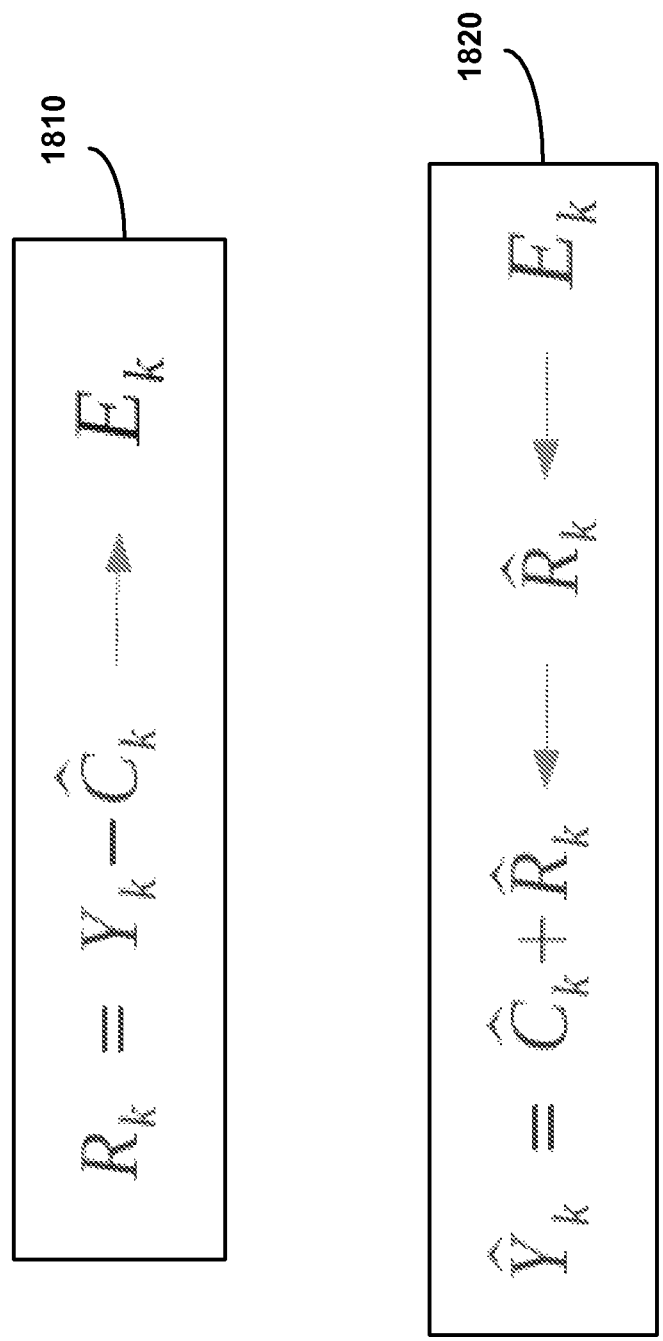
FIG. 18 describes the O Codec.

Stage III (E) At iteration k=N−1 , . . . , 0:
1) The Expand operation is determined by the respective up sampling, interpolation, oracle and deblurring operators. That is, we apply the up sampling operator $?^{(k)}$ followed by the interpolation operator $I^{(k)}$ to $\hat{Y}_{k+1}$ yielding video $\hat{Z}_k^0$. Then we apply the oracle operator $O^{(k)}$ to $\hat{Z}_k^0$, yielding $\hat{Z}_k$, the reconstructed version of video $Z_k$ of Stage I (E) above. The oracle operation, which reconstructs the best approximation $\hat{Z}_k$ to $Z_k$ based on $\hat{Z}_k^0$ may use such methods as super resolution see Ref. [5] and compressed sensing see Ref. [6]. Finally, we apply the deblurring operator $B_{inv}^{(k)}$ to $\hat{Z}_k$ yielding $\hat{C}_k$, see unit 1720.
2) The Resultant operation is simply the difference operation. That is, the residual $R_k$ is the difference between $Y_k$ and $\hat{C}_k$. Then, we Encode the residual $R_k$ into $E_k$, see unit 1810 of FIG. 18.
3) We then Decode the reconstructed residuals $\hat{R}_k$ from $E_k$. The Assemble operation being simply the summation operation, we add $\hat{R}_k$ to $\hat{C}_k$ to get video $\hat{Y}_k$, see unit 1820.

In the Bit Stream 1100:
The ctrl information contains the parameters as in FIG. 16, in addition to N.

In the Decoder 1200:
Stage I (D) consists of the Process and Decompress operations, as before.

Stage II (D) At iteration k=N−1, . . . , 0:
1) We use the Expand operation as in step 1 of Stage III (E) above to reconstruct video $\hat{C}_k$ from video $\hat{Y}_{k+1}$, see unit 1720.

2) We use the Decode operation to get $\hat{R}_k$ and then the Assemble operation as in step 3 of Stage III (E) above to reconstruct $\hat{Y}_k$ from $\hat{C}_k$ and $\hat{R}_k$, see unit 1820.

EXAMPLE III

The Oracle Multiwavelet (OM) Codec

We combine the Oracle Codec together with the Multiwavelet Codec as follows:

We define the $m_k$ multiwavelet filters, see unit 1310, based on the O Codec parameters, see FIG. 16. We call the resulting method the OM Codec.

Figure 19:
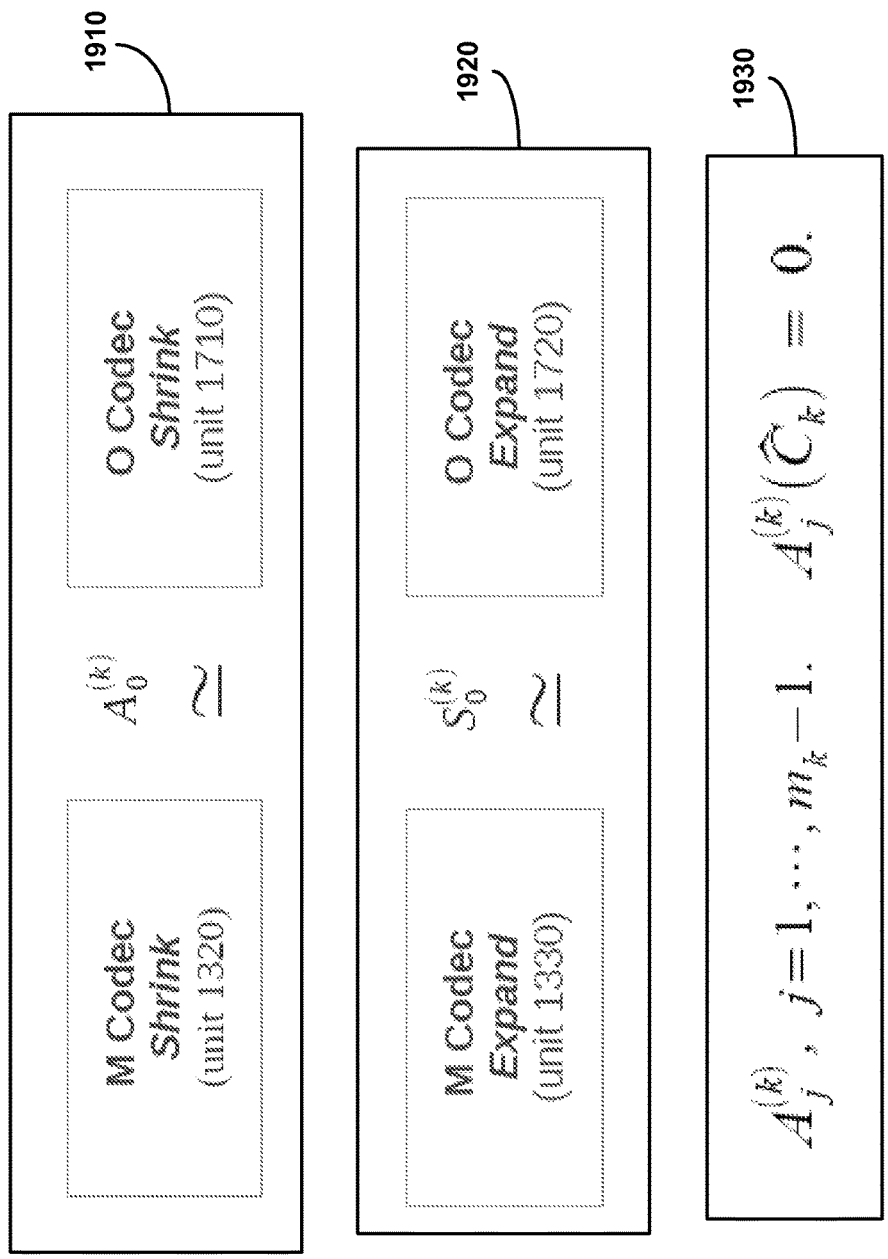
FIG. 19 describes the OM Codec.

We now describe how to obtain the DMWT filters given the O Codec parameters:
1) We define the low pass analysis filter $A_0^{(k)}$ so that the resulting Shrink method approximates the given O Codec Shrink method, see unit 1910 of FIG. 19.
2) We define the low pass synthesis filter $S_0^{(k)}$ so that the resulting Expand method approximates the given O Codec Expand method, see unit 1920.
3) We define the set of $m_k$ ? 1 high pass analysis filters $A_1^{(k)}, A_2^{(k)}, ?, A_{m_k-1}^{(k)}$, to be the multiwavelet filters that annihilates $\hat{C}_k$, see unit 1930.
4) We complete the set of DMWT filters, by setting $S_1^{(k)}$, $S_2^{(k)}, ? , S_{m_k-1}^{(k)}$. This we do using the mathematical theory of wavelets, see Ref. [4] and Pat. [2].

The ctrl information contains the parameters as in FIG. 16, and the corresponding DMWT filters as in FIG. 19, in addition to N.

Figure 20:
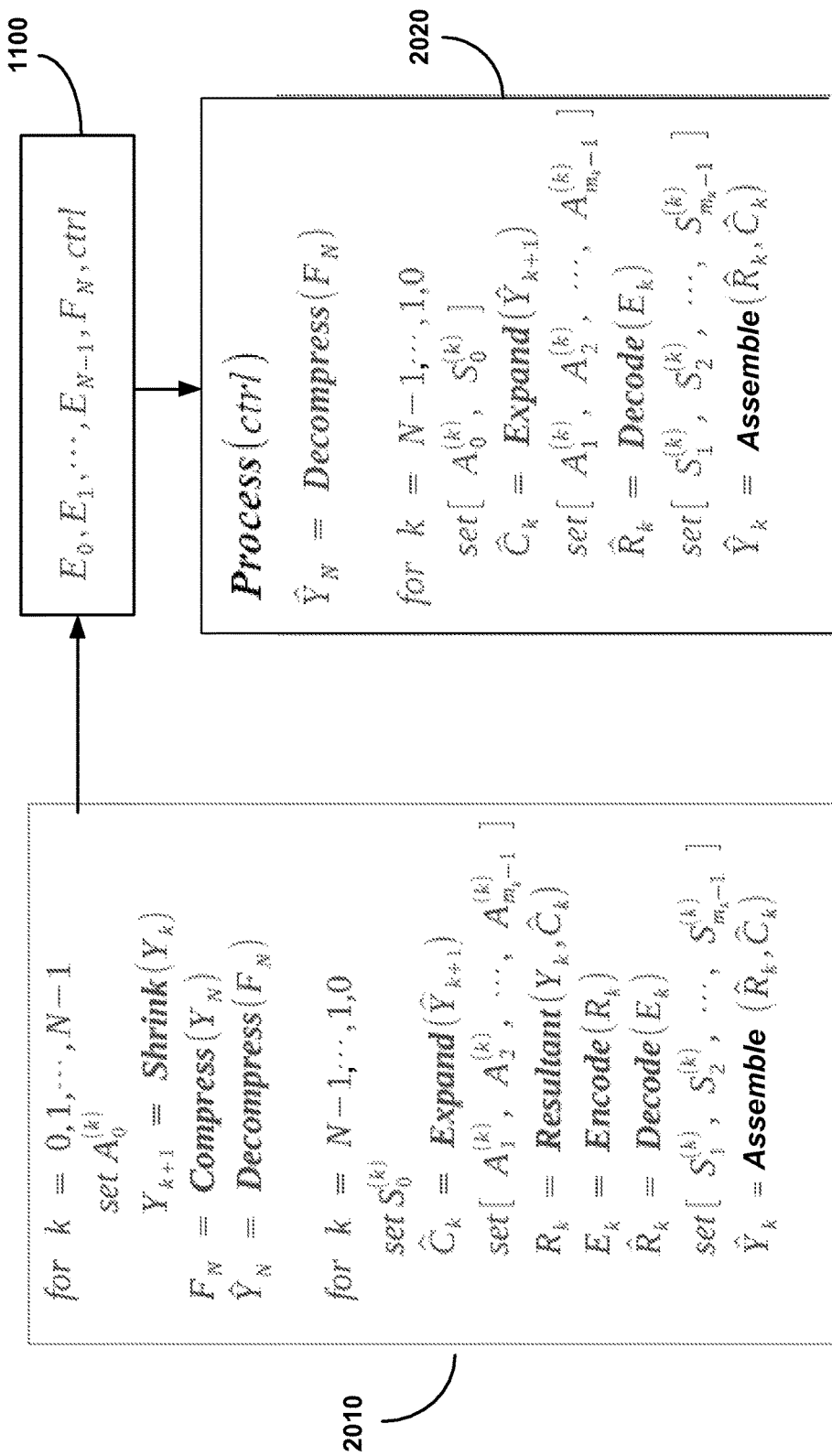
FIG. 20 describes the OM Codec.

A flowchart of the OM Codec is depicted in FIG. 20. The Encoder flowchart is depicted in unit 2010, and the Decoder in unit 2020.

The following documents are referenced in the application and are all incorporated by reference herein.

PATENTS

[1] Ilan Bar-On and Oleg Kostenko, A Method And A System For Wavelet Based Processing, WO/2008/081459.
[2] Ilan Bar-On, Method And Apparatus For A Multidimensional Discrete Multiwavelet Transform, U.S. Pat. No. 8,331,708 B2, Dec. 11, 2012.

REFERENCES

[1] "Computer Vision, A Modern Approach", D. Forsyth and J. Ponce, 2012.
[2] "ITU-R Recommendation BT. 709", http://en.wikipedia.org/wiki/Rec._709
[3] "Cut by Cut", G. Chandler, 2012.
[4] "Wavelets and Multiwavelets", Fritz Keinert, 2004.
[5] "Super-Resolution Imaging", P. Milanfar, Sep. 2010.
[6] "Compressed Sensing, Theory and Applications", Y. C. Eldar et al., June 2012.
[7] "Optical flow", http://en.wikipedia.org/wiki/Optical_flow.

The invention claimed is:
1. A method of decoding an encoded video, comprising:
receiving a bit stream consisting of:
a compressed lowest resolution video;
control information comprising a number of iterations N;
respective N compressed residuals; and processing said received bit stream by:
    creating a lowest resolution reconstructed video by decompressing said lowest resolution compressed video; and
    performing a raise operation on said lowest resolution reconstructed video, said raise operation comprising sequentially creating N higher resolutions reconstructed videos, wherein at least one of said N higher resolution videos is a higher temporal resolution video, each one of said higher resolution reconstructed videos created from a preceding created lower resolution reconstructed video by:
    1) analyzing said preceding created lower resolution reconstructed video by at least one of motion field calculation and object recognition;
    2) using said analysis to create a higher resolution video from said preceding created lower resolution reconstructed video;
    3) decoding the respective residual; and
    4) combining said respective decoded residual with said created higher resolution video, yielding the respective higher resolution reconstructed video.

2. The method of claim 1, wherein said control information comprises low pass synthesis filters and wherein creating said higher resolution video comprises applying a low pass synthesis filter to said preceding created lower resolution reconstructed video.

3. The method of claim 1, wherein said control information comprises up sampling, interpolation, oracle and deblurring operators and wherein creating a higher resolution video comprises:
    a. applying an up sampling operator followed by an interpolation operator to said preceding created lower resolution reconstructed video;
    b. applying an oracle operator to the interpolation operation result, said oracle operation reconstructing the best approximation to the higher resolution video from the preceding created lower resolution reconstructed video using at least one of motion field calculation and object recognition; and
    c. applying a deblurring operator to the oracle operation result.

4. The method of claim 2, wherein said bit stream control information comprises up sampling, interpolation, oracle and deblurring operators and wherein said low pass synthesis filters are computed from said up sampling, interpolation, oracle and deblurring operators.

5. The method of claim 1, wherein said control information comprises high pass synthesis filters and wherein creating the higher resolution reconstructed video comprises applying the high pass synthesis filters to the respective decompressed residuals and adding the results to the higher resolution video.

6. A video codec comprising an encoding unit and a decoding unit, said encoding unit configured to:
    (i) receive a video;
    (ii) perform a shrink operation on said received video, said shrink operation comprising: creating a first lower resolution video from said video; and sequentially creating additional N−1 lower resolution videos, each one of said additional lower resolution videos created from a preceding created lower resolution video, wherein at least one of said N lower resolution videos is a lower temporal resolution video;
    (iii) create a lowest resolution reconstructed video by compressing and decompressing said lowest resolution video;
    (iv) perform a raise operation on said lowest resolution reconstructed video, said raise operation comprising sequentially creating N higher resolutions reconstructed videos, wherein at least one of said N higher resolution reconstructed videos is a higher temporal resolution video, each one of said higher resolution reconstructed videos created from said preceding created lower resolution video by:
        a. simulate the following operations performed in the decoding unit:
            1) analyzing said preceding created lower resolution reconstructed video by at least one of motion field calculation and object recognition;
            2) using said analysis to create a higher resolution video from said preceding created lower resolution reconstructed video;
        b. compute a respective residual between said higher resolution video created in said raise operation and a same resolution video created in said shrink operation;
        c. compress said computed residual;
        d. simulate the following operations performed in the decoding unit:
            3) decoding the respective residual;
            4) combining said respective decoded residual with said created higher resolution video, yielding the respective higher resolution reconstructed video; and
        e. provide to said decoding unit a bit stream consisting of said compressed lowest resolution video, said compressed residuals and control information comprising said number of created higher resolutions reconstructed videos N; and
    said decoding unit configured to:
    (v) receive and process said bit stream;
    (vi) create a lowest resolution reconstructed video by decompressing said compressed lowest resolution video;
    (vii) perform a raise operation on said lowest resolution reconstructed video, said raise operation consisting of sequentially creating N higher resolution reconstructed videos, wherein at least one of said N higher resolution reconstructed videos is a higher temporal resolution video, each one of said higher resolution reconstructed videos created from said preceding lower resolution reconstructed video by:
        1) analyzing said lower resolution reconstructed video by at least one of motion field calculation and object recognition;
        2) using said analysis to create a higher resolution video from said preceding created lower resolution reconstructed video;
        3) decoding the respective residual; and
        4) combining said respective decoded residual with said created higher resolution video, yielding the respective higher resolution reconstructed video.

7. A method of encoding video to be decoded by the decoding method of claim 1, comprising:
    (i) receiving a video;
    (ii) performing a shrink operation on said received video, said shrink operation comprising:
        creating a first lower resolution video from said video; and
        sequentially creating additional N−1 lower resolution videos, each one of said additional lower resolution videos created from a preceding created lower resolution video, wherein at least one of said N lower resolution videos is a lower temporal resolution video;
(iii) compressing the lowest resolution video;
(iv) creating a lowest resolution reconstructed video by decompressing said lowest resolution compressed video;
(v) performing a raise operation on said lowest resolution reconstructed video, said raise operation comprising sequentially creating N higher resolutions reconstructed videos, wherein at least one of said N higher resolution reconstructed videos is a higher temporal resolution video, each one of said higher resolution reconstructed videos created from a preceding created lower resolution reconstructed video by
a. simulating the following operations performed by the decoder of claim 1:
  1) analyzing said preceding created lower resolution reconstructed video by at least one of motion field calculation and object recognition; and
  2) using said analysis to create a higher resolution video from said preceding created lower resolution reconstructed video;
b. computing a residual between said created higher resolution video and a same resolution video created in said shrink operation;
c. compressing said computed residual;
d. simulating the following operations performed by the decoder of claim 1:
  3) decoding the respective residual; and
  4) combining said respective decoded residual with said created higher resolution video, yielding the respective higher resolution reconstructed video; and
(vi) providing a bit stream consisting of said lowest resolution compressed video, said compressed residuals and control information comprising said number of created higher resolutions reconstructed videos N.

8. The method of claim 7, wherein said control information comprises low pass analysis filters and wherein creating a lower resolution video comprises applying a low pass analysis filter to a video.

9. The method of claim 7, wherein said control information comprises blurring and down sampling operators and wherein creating a lower resolution video comprises applying a blurring operator to a video and applying a down sampling operator to the blur operation result.

10. The method of claim 8, wherein said control information comprises blurring and down sampling operators and wherein said low pass analysis filters are computed from said blurring and down sampling operators.

11. The method of claim 7, wherein said control information comprises high pass analysis filters and wherein computing the residuals comprises applying high pass analysis filters to the difference between each higher resolution video created in said raise operation and the same resolution video created in said shrink operation.

* * * * *

UNITED STATES PATENT AND TRADEMARK OFFICE
CERTIFICATE OF CORRECTION

PATENT NO. : 10,334,256 B2
APPLICATION NO. : 14/433780
DATED : June 25, 2019
INVENTOR(S) : Bar-On Page 1 of 1

It is certified that error appears in the above-identified patent and that said Letters Patent is hereby corrected as shown below:

In the Specification

Column 3, Line 1, delete "?" and insert --Z--.
Line 2, delete "?" and insert --R--.
Line 3, delete "?" and insert --Z--.
Line 4, delete "?" and insert --Z--.
Line 5, delete "?" and insert --Z--.

Column 7, Line 6, delete "?" and insert --≡--.

Column 8, Line 54, delete "?" and insert -- - --.
Line 55, delete "?" and insert --…--.
Line 58, delete "?" and insert -- - --.
Line 61, delete "?" and insert -- - --.
Line 63, delete "?" and insert -- - --.
Line 64, delete "?" and insert -- - --.
Line 66, delete "?" and insert --…--.

Column 9, Line 11, delete "?" and insert -- - --.
Line 34, delete "?" and insert -- - --.
Line 41, delete "?" and insert --↓--.

Column 10, Line 23, delete "?" and insert --↑--.
Line 24, delete "?" and insert -- - --.
Line 27, delete "?" and insert --…--.

Signed and Sealed this
Thirteenth Day of August, 2019

Andrei Iancu
*Director of the United States Patent and Trademark Office*